(12) United States Patent
Erie et al.

(10) Patent No.: US 9,269,065 B2
(45) Date of Patent: Feb. 23, 2016

(54) AUTOMATED PRODUCT SHIPMENT WITH CARRIER QUALITY FEEDBACK

(75) Inventors: Clinton William Erie, Adams, MN (US); Jason Scott Lee, Oronoco, MN (US); Ryan T. Paske, Rochester, MN (US); James P. Wilson, Stewartville, MN (US)

(73) Assignee: International Business Machines Corporation, Armonk, NY (US)

( * ) Notice: Subject to any disclaimer, the term of this patent is extended or adjusted under 35 U.S.C. 154(b) by 1416 days.

(21) Appl. No.: 12/644,441

(22) Filed: Dec. 22, 2009

(65) Prior Publication Data

US 2011/0153513 A1    Jun. 23, 2011

(51) Int. Cl.
*G06Q 30/00* (2012.01)
*G06Q 10/08* (2012.01)

(52) U.S. Cl.
CPC ............ *G06Q 10/08* (2013.01); *G06Q 10/0834* (2013.01); *G06Q 10/08345* (2013.01)

(58) Field of Classification Search
CPC ............ G06Q 10/083; G06Q 10/0834; G06Q 10/08345
USPC .......................................................... 700/216
See application file for complete search history.

(56) References Cited

U.S. PATENT DOCUMENTS

| 4,799,156 | A * | 1/1989 | Shavit et al. ............... 705/26.3 |
| 6,173,210 | B1 * | 1/2001 | Bjornson et al. ............... 700/99 |
| 6,175,825 | B1 * | 1/2001 | Fruechtel ..................... 705/404 |
| 6,829,037 | B2 * | 12/2004 | Hill ................................. 355/40 |
| 7,035,856 | B1 * | 4/2006 | Morimoto .................... 705/7.12 |
| 7,430,517 | B1 * | 9/2008 | Barton ......................... 705/7.24 |
| 7,499,871 | B1 * | 3/2009 | McBrayer et al. ........... 705/7.13 |
| 7,644,004 | B2 * | 1/2010 | Guyett et al. ................. 705/1.1 |
| 2001/0034608 | A1 * | 10/2001 | Gendreau ......................... 705/1 |
| 2002/0019759 | A1 * | 2/2002 | Arunapuram et al. ............. 705/7 |
| 2002/0065738 | A1 * | 5/2002 | Riggs et al. ..................... 705/26 |
| 2002/0095347 | A1 | 7/2002 | Cummiskey |
| 2002/0156688 | A1 * | 10/2002 | Horn et al. ...................... 705/26 |
| 2003/0046133 | A1 * | 3/2003 | Morley et al. .................... 705/8 |
| 2003/0200111 | A1 * | 10/2003 | Damji ............................. 705/1 |
| 2003/0229530 | A1 * | 12/2003 | Lai .................................. 705/8 |

(Continued)

OTHER PUBLICATIONS

Oracle, "Information Delivers—Oracle Transportation Management" Available from http://www.oracle.com/industries/travel_transportation/oracle-transportation-brochure.pdf, 2004.

*Primary Examiner* — Allen J Jung
(74) *Attorney, Agent, or Firm* — Thomas E. Tyson; Steven L. Bennet; Damion Josephs

(57) ABSTRACT

The present invention provides a method for shipping products that include (a) sending requests for quotations by electronic transmission to a plurality of selected carriers based upon customer order specifications, available delivery options and a carrier quality database; (b) selecting a carrier quotation based upon quotations received by electronic transmission and the carrier quality database and updating the carrier quality database with the selected carrier and quotation; (c) preparing the product shipment including using an optical scanner to measure shipment dimensions and a weight scale to measure shipment weight of the product shipment; and (d) if the measured dimensions and weight do not conform to the selected quotation, repeating steps (b) and (c) with measured shipment dimensions and weight or, if the measured dimensions and weight do conform to the selected quotation, notifying carrier to ship the product.

15 Claims, 9 Drawing Sheets

(56) References Cited

U.S. PATENT DOCUMENTS

| | | | |
|---|---|---|---|
| 2004/0184016 A1* | 9/2004 | Hill .................................. 355/40 |
| 2004/0215480 A1* | 10/2004 | Kadaba ............................ 705/1 |
| 2005/0043980 A1* | 2/2005 | Edlin et al. ....................... 705/8 |
| 2005/0091149 A1* | 4/2005 | Borgeson et al. ................ 705/37 |
| 2005/0209913 A1* | 9/2005 | Wied et al. ....................... 705/12 |
| 2006/0100889 A1* | 5/2006 | Gosko ............................... 705/1 |
| 2006/0136237 A1* | 6/2006 | Spiegel et al. .................... 705/1 |
| 2006/0224426 A1 | 10/2006 | Goossens |
| 2006/0230003 A1* | 10/2006 | Sung et al. ...................... 705/414 |
| 2007/0016538 A1* | 1/2007 | Bielefeld et al. ................ 705/410 |
| 2008/0004931 A1 | 1/2008 | Kambs |
| 2008/0126157 A1* | 5/2008 | Rousso et al. .................... 705/7 |
| 2008/0162304 A1* | 7/2008 | Ourega ............................ 705/27 |
| 2008/0306795 A1 | 12/2008 | Ho |
| 2009/0063309 A1* | 3/2009 | Stephens ......................... 705/29 |
| 2009/0164337 A1* | 6/2009 | Hoffman ......................... 705/26 |
| 2009/0182687 A1* | 7/2009 | Stickler et al. ................. 705/402 |
| 2009/0210313 A1* | 8/2009 | Winebrake et al. ............. 705/26 |
| 2009/0265248 A1* | 10/2009 | Walker ............................ 705/17 |
| 2010/0125494 A1* | 5/2010 | Boss et al. ................. 705/14.19 |

* cited by examiner

Shipment Characteristics

| Entity # | Ship Date (maybe?) | Customer Requested Arrival Date | Ship From Location | Ship From Country | Ship To Location | Ship To Country | Dom / WT | Customs Value $ | Override ? |
|---|---|---|---|---|---|---|---|---|---|
| 123456 | 2008-03-01 | 2008-07-07 | Rochester, MN | USA | Taipei, Taiwan | Taiwan | WT | $60,000 | N |
| | | | | | | | | | |
| | | | | | | | | | |
| | | | | | | | | | |

Figure 3

| Entity | Option # | Pallet | Qty | Length | Width | Height | Dimension Weight | Actual Weight |
|---|---|---|---|---|---|---|---|---|
| Cust A | 1 | y | 1 | 48 | 40 | 36 | 411 | 444 |
| Cust A | 2 | y | 2 | 24 | 40 | 36 | 205 | 480 |
| Cust A | 3 | y | 3 | 16 | 40 | 36 | 180 | 540 |
| Cust A | 4 | n | 10 | 12 | 20 | 20 | 510 | 680 |

Shipping Options

Figure 4

| Carrier RFQ | | | | | | |
|---|---|---|---|---|---|---|
| Carrier | Greater than 35 lbs - Pallet | Less than 35 lbs - No Pallet | Domestic | WT | On Time Rating | Quality Rating |
| Carrier 1 |  | ✓ | ✓ | ✓ | ✓ |  |  |
| Carrier 2 |  | ✓ | ✓ | ✓ |  |  |
| Carrier 3 | ✓ | ✓ | ✓ |  |  |  |
| Carrier 4 | ✓ | ✓ | ✓ | ✓ |  |  |
| Carrier 5 |  | ✓ | ✓ | ✓ |  |  |

Figure 5

| Carrier | Quote id | SLA | Delivery Date | Cost |
|---|---|---|---|---|
| Carrier 1 | 3734 | 1 | 7/4/08 | $530 |
|  |  | 2 | 7/8/08 | $265 |
|  |  | 3 | 7/11/08 | $110 |
| Carrier 2 | 3735 | 1 | 7/3/08 | $515 |
|  |  | 2 | 7/7/08 | $250 |
|  |  | 3 | 7/10/08 | $98 |
| Carrier 3 | 3736 | 1 | 7/4/08 | $510 |
|  |  | 2 | 7/8/08 | $252 |
|  |  | 3 | 7/11/08 | $91 |

Figure 6

Carrier Rating Table

| | On Time Delivery Rating (1-10) | Quality Rating (1-10) | Green Rating (1-3) | Carrier Rating | Acceptable Cost Range | Win % |
|---|---|---|---|---|---|---|
| Carrier 1 | 10 | 9 | 3 | 22 | +$10 | 50% |
| Carrier 2 | 10 | 7.5 | 2 | 19.5 | +$10 | 25% |
| Carrier 3 | 5 | 8.5 | 1 | 14.5 | +$7.75 | 10% |
| Carrier 4 | 5 | 8 | 1 | 14 | +$2.50 | 5% |
| Carrier 5 | 7 | 10 | 2 | 19 | +$10 | 10% |

Figure 7

AUTOMATED PRODUCT SHIPMENT WITH CARRIER QUALITY FEEDBACK

RELATED APPLICATIONS

This application is related to a co-pending U.S. patent application having the same assignee entitled "Dynamic Bulk Packaging and Casing," (Ser. No. 12/195,781) filed Aug. 21, 2008.

BACKGROUND OF THE INVENTION

1. Technical Field

The present invention relates to customer product shipment operations. In particular, the present invention relates to a system to optimize customer product shipment carrier operations.

2. Description of the Related Art

A major concern in today's market is packing and shipping products ordered by customers in an efficient manner to provide prompt delivery for maximizing customer satisfaction. Given the increased demands caused by the large number of products being sold, the multitude of customer destinations, multiple carriers along with factors such as trade zones, ever-changing transportation costs and a variety of customer product packaging requirements, efficient shipping has become very challenging.

Current solutions that attempt to address this complexity of product shipment include the consolidating of products for shipment and the selecting carriers based on destinations. In addition, renegotiated contracts have been employed to obtain the best rate from carriers. However, these existing solutions do not work all the time and require time consuming manual inputs. Therefore, it is very difficult to address the rapidly changing dynamics of a "build to order" factory/distribution center where multiple products of various sizes and shapes are shipped.

SUMMARY

In accordance with the present invention, a method is provided for shipping products that include (a) sending requests for quotations by electronic transmission to a plurality of selected carriers based upon customer order specifications, available delivery options and a carrier quality database; (b) selecting a carrier quotation based upon quotations received by electronic transmission and the carrier quality database and updating the carrier quality database with the selected carrier and quotation; (c) preparing the product shipment using an optical scanner to measure shipment dimensions and a weight scale to measure shipment weight; and (d) if the measured shipment dimensions and weight do not conform to the selected quotation, repeating steps (b) and (c) with measured shipment dimensions and weight or, if the measured dimensions and weight do conform to the selected quotation, notifying carrier to ship the product.

BRIEF DESCRIPTION OF THE DRAWINGS

The present invention may be better understood, and its numerous objects, features, and advantages made apparent to those skilled in the art by referencing the accompanying drawings.

FIG. 3 is a table listing characteristics of a specific shipment;

FIG. 4 is a table listing shipping options for a specific customer shipment;

FIG. 5 is a table listing different carrier request for quotation responses;

FIG. 6 is a table listing details of carrier shipment quotations;

FIG. 7 is a table listing carrier quality factors;

DETAILED DESCRIPTION

Figure 1:
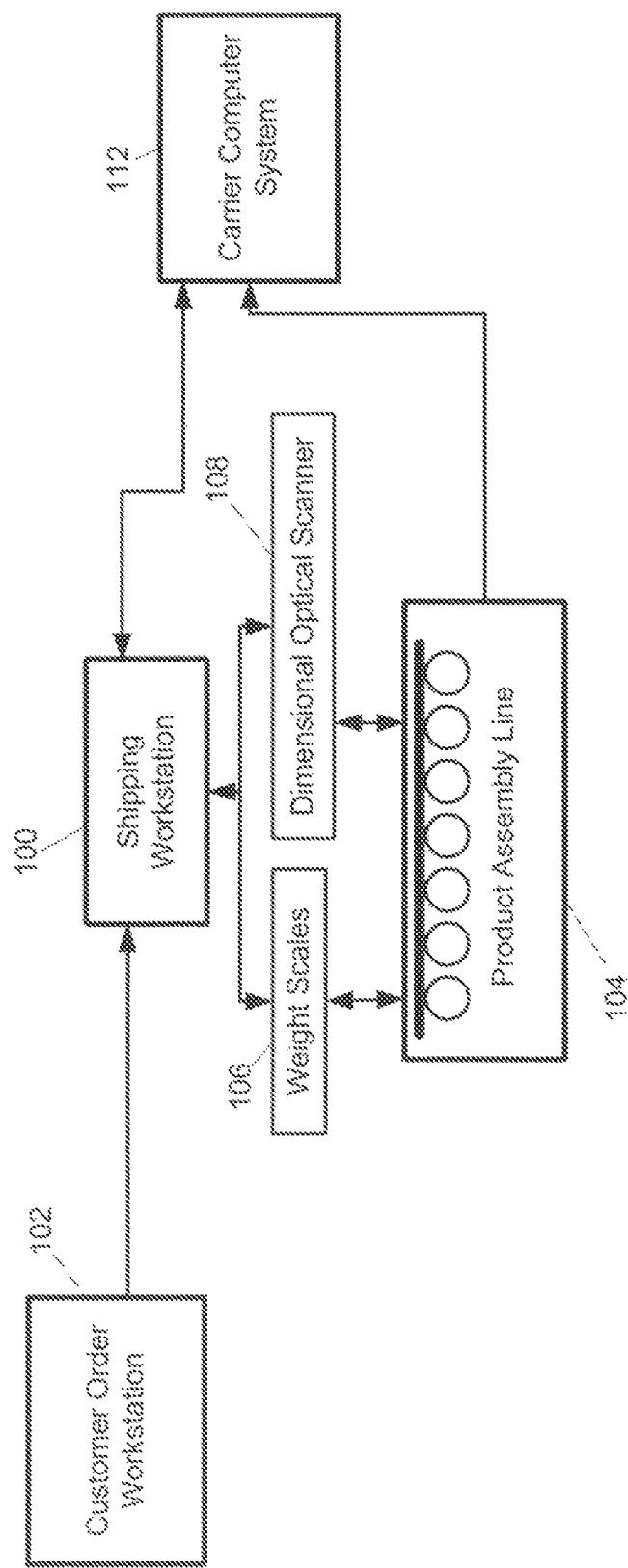
FIG. 1 is a block diagram illustrating a product shipment data processing operation.

The following is intended to provide a detailed description of an example of the invention and should not be taken to be limiting of the invention itself. Rather, any number of variations may fall within the scope of the invention, which is defined in the claims following the description.

The present invention is a method and computer program product that provides a method of shipping products including sending requests for quotations by electronic transmission to a plurality of selected carriers; (b) selecting a carrier quotation based upon quotations received by electronic transmission and the carrier quality database and updating the carrier quality database with the selected carrier and quotation; (c) preparing the product shipment using an optical scanner to measure shipment dimensions and a weight scale to measure shipment weight; and (d) if the measured dimensions and weight do not conform to the selected quotation, repeating steps (b) and (c) with the measured shipment dimensions and weight or, if the measured dimensions and weight do conform to the selected quotation, notifying carrier to ship the product. In addition a system is provided that includes a communications network connected to at least one customer and several carriers. The system further has a shipping processor connected to the communications network having a memory containing a carrier quality database and a program to communicate with the customer for the customer order and the carriers to receive shipment quotations, and to select a carrier, determine that the shipment is ready according to specifications in the selected carrier quotations and to update the carrier quality database.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction implementation system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction implementation system, apparatus, or device.

Program code embodied on a computer readable medium may be transmitted using any appropriate medium, including but not limited to wireless, wire line, optical fiber cable, RF, etc. or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may be implemented entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which are implemented via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which are implemented on the computer or other programmable apparatus provide processes for implementing the functions/acts specified in the flowchart and/or block diagram block or blocks.

FIG. 1 is a block diagram illustrating an automated product shipment operation. A data processing system includes a shipping workstation 100 configured to receive customer order data from a customer order workstation 102 and to provide communications with various carrier computer systems illustrated as carrier computer system 112. In addition, the shipping workstation 100 is connected to a dimensional optical scanner 108 and weighing scales 106. The scales 106 in the scanner 180 are part of a production assembly line 104 that assembles the customer products into a shipment package to be delivered to customers by a selected carrier.

Figure 2:
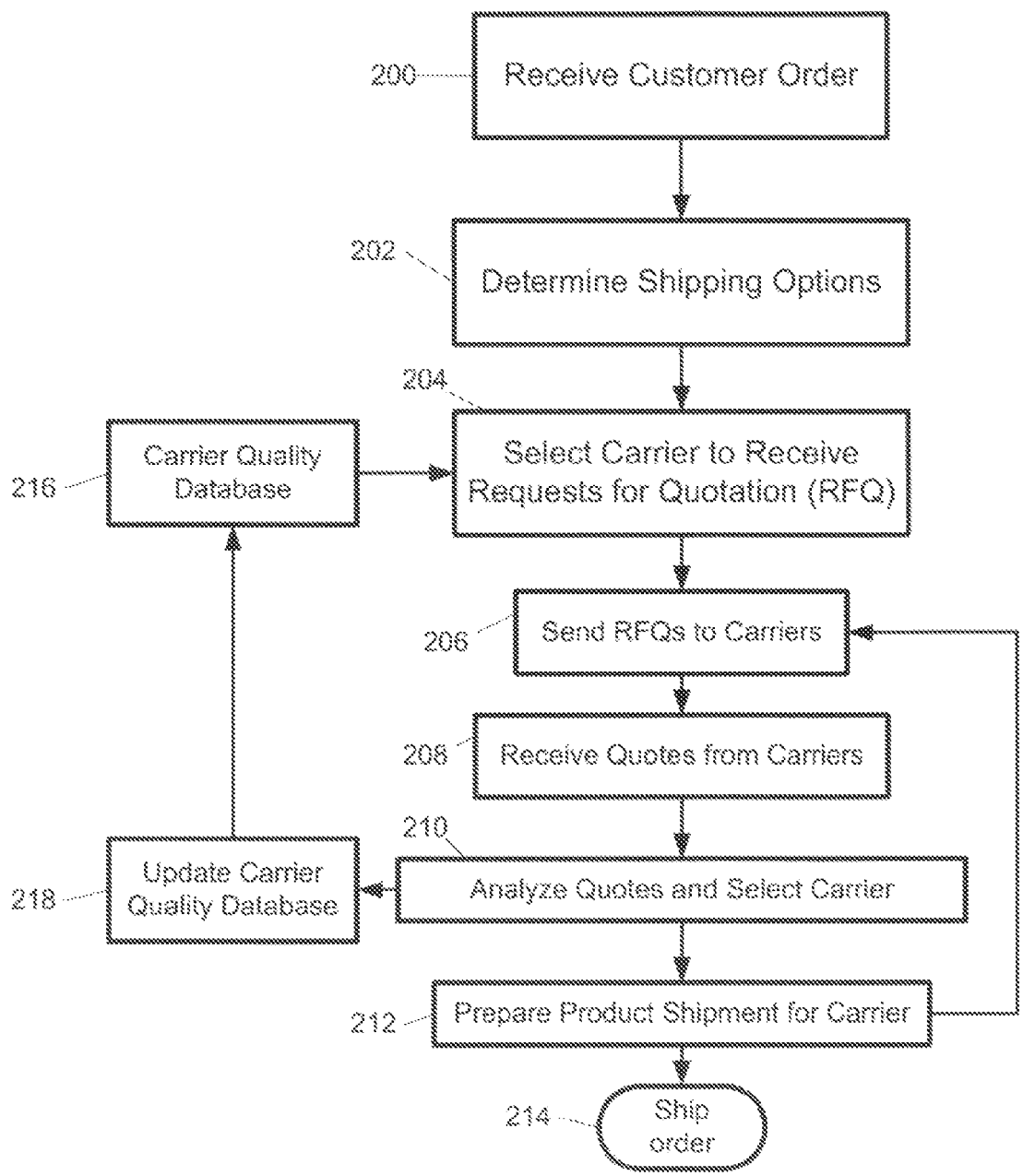
FIG. 2 is a software flow chart illustrating the shipment and carrier selection process.
Figure 8:
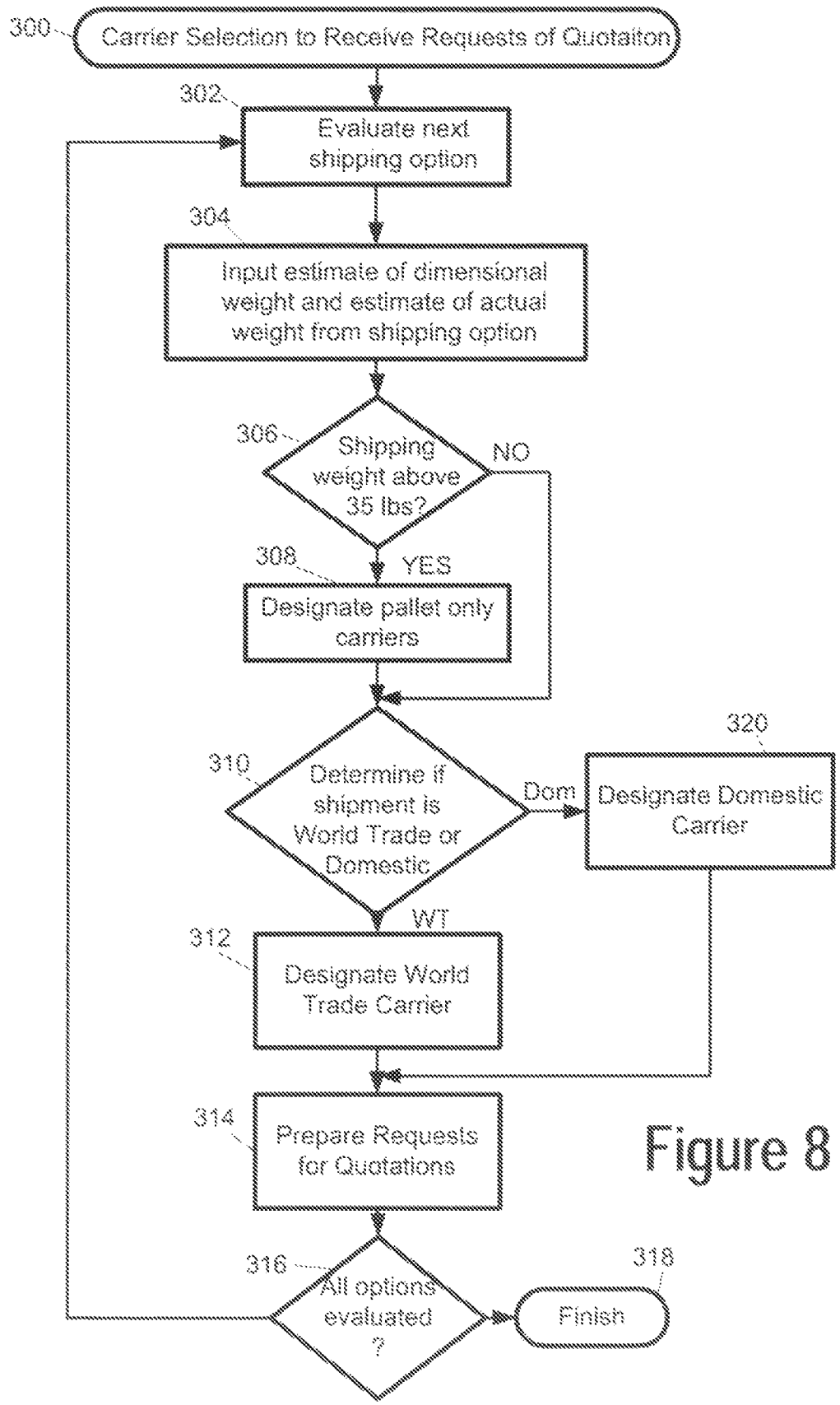
FIG. 8 is a software flowchart illustrating the process determining which carriers receive a request for quotation.
Figure 11:
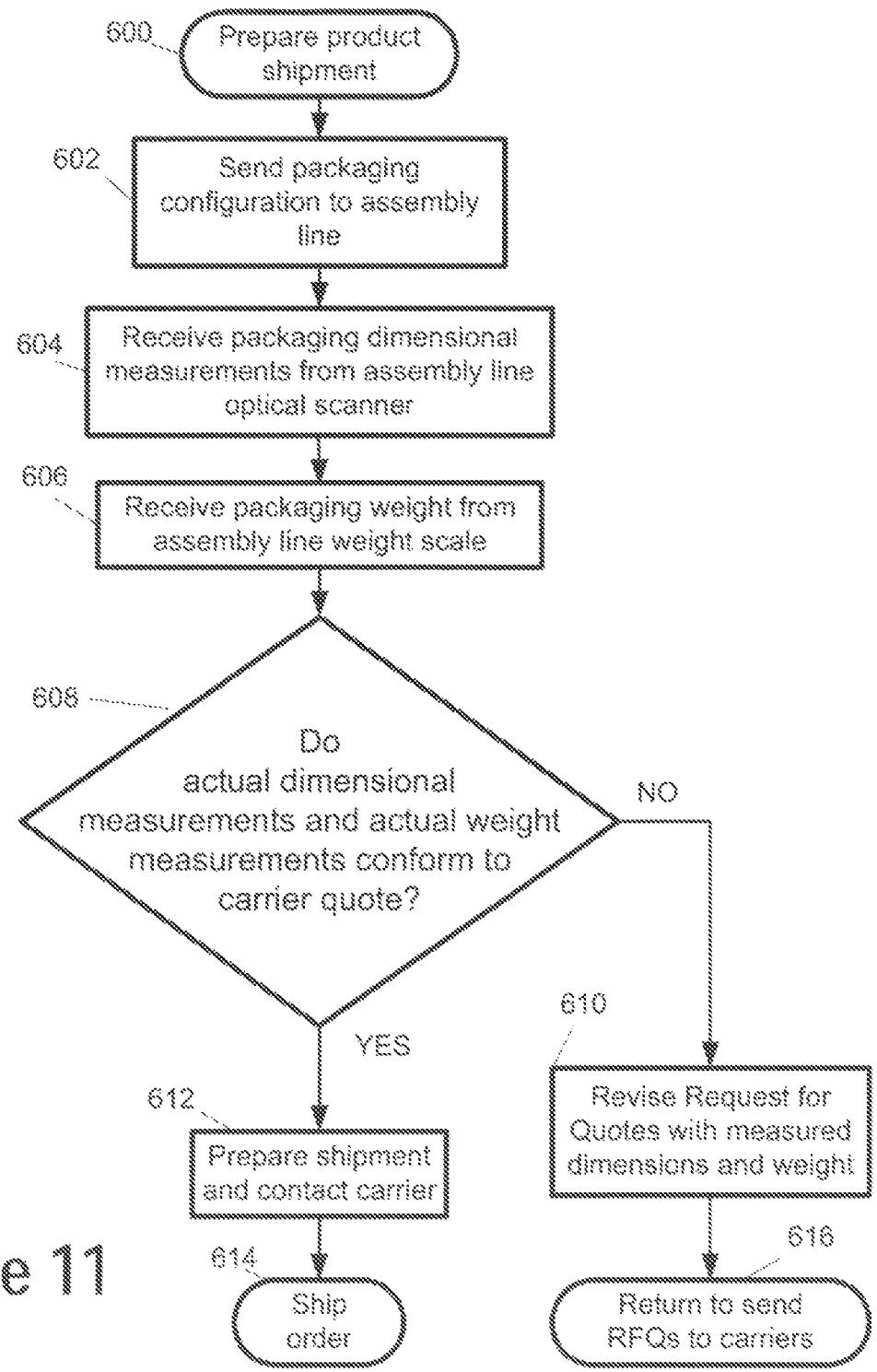
FIG. 11 is a software flowchart illustrating the process for preparing a customer product shipment.

A computer program resides in the shipping workstation 100. A flowchart illustrating a functional view of this program is illustrated in FIG. 2. Referring to FIG. 2, in step 200, the customer order is received and provided to step 202 to determine the possible shipping. In the preferred embodiment of this invention, at least some of the shipping options would be obtained from a separate program disclosed in a co-pending patent application Ser. No. 12/195,781, filed Aug. 21, 2008 and titled "Dynamic Bulk Packaging and Casing" which is herein incorporated by reference. In step 204, the program determines which carriers are to receive request for quotations (RFQ). This determination requires data from a carrier quality database shown as block 216. This database includes a listing of the potential carriers with additional information used for their selection. This selection process is discussed in illustrated in greater detail in FIG. 8. After the carriers are selected, in step 206, the requests for quotation are sent to these selected carriers. In step 208, quotes are received from the carriers. In step 210, these received quotes are analyzed to select a carrier. This process is illustrated in more detail in FIG. 9. Information about the received quote and the selected carrier is used to update the carrier quality database in step 218. FIG. 11 illustrated this updating step in greater detail. In step 212, the product shipment is prepared for the carrier. This preparation process includes ensuring that the product shipment conforms to the specifications of the carriers quote. If the actual product shipment does not conform to the specifications of the quote, new specifications are then provided to step 206 so that a new request for quotation can be sent to selected carriers. Then the process of receiving the quotes and analyzing the quotes is repeated. Once it is determined that the product shipment has been prepared conforms to the selected, then the carrier is notified to ship the order in step 214.

In FIG. 3, a table is shown which includes details of a typical customer. These are details provided to a carrier in order for the carrier to provide a quote for the shipment. These details would include the customer requested arrival date, origin location of the shipment, and shipment destination which determine whether the shipment is a domestic shipment (DOM) or a world trade shipment (WT).

FIG. 4 illustrates a table of shipping options. The shipping options would be the information provided by the co-pending patent application previously discussed and would list details of these different shipping options.

The carrier quality database consists of several tables that are illustrated in FIGS. 5, 6 and 7. FIG. 5 is a table that lists carrier information useful in selecting which carriers to receive a request for quotation (RFQ). FIG. 6 is a table listing examples of quotes that received from three different carriers. FIG. 7 is a carrier rating table including information of past performance and other quality factors that are used analyzed with the quotations received (illustrated in FIG. 6) to select a carrier for this specific customer shipment. A key aspect of the present invention is the automated updating of this carrier quality table information in order to provide the best and most current detail information for selection of a quality carrier.

In FIG. 2, program step 204 determines the carriers to receive requests for quotation. This process is illustrated in more detail in FIG. 8. In step 302, a shipping option is evaluated such as a shipping option illustrated in FIG. 4. In step 304, estimates of the weight and size of the shipment are made from the shipping option. In step 306, it is determined whether the shipping weight of the product shipment is greater than 35 pounds. If so, in step 380, the shipment is designated as a palette only shipment meaning that palette only carriers should receive requests for quotation. However, returning to step 306, if the weight is less than 35 pounds, a palette only designation is not made. In step 310, it is determined whether the shipment is a world trade shipment or a domestic shipment. In step 320, the shipment is designated a domestic shipment or alternatively, in step 312, the shipment is designated as a world trade shipment. In step 314, the requests for quotation are prepared for selected carriers based the above shipment determinations. In step 316, the next shipping option is in the evaluated. Once all the shipping options have been evaluated, the process is finished.

Figure 9:
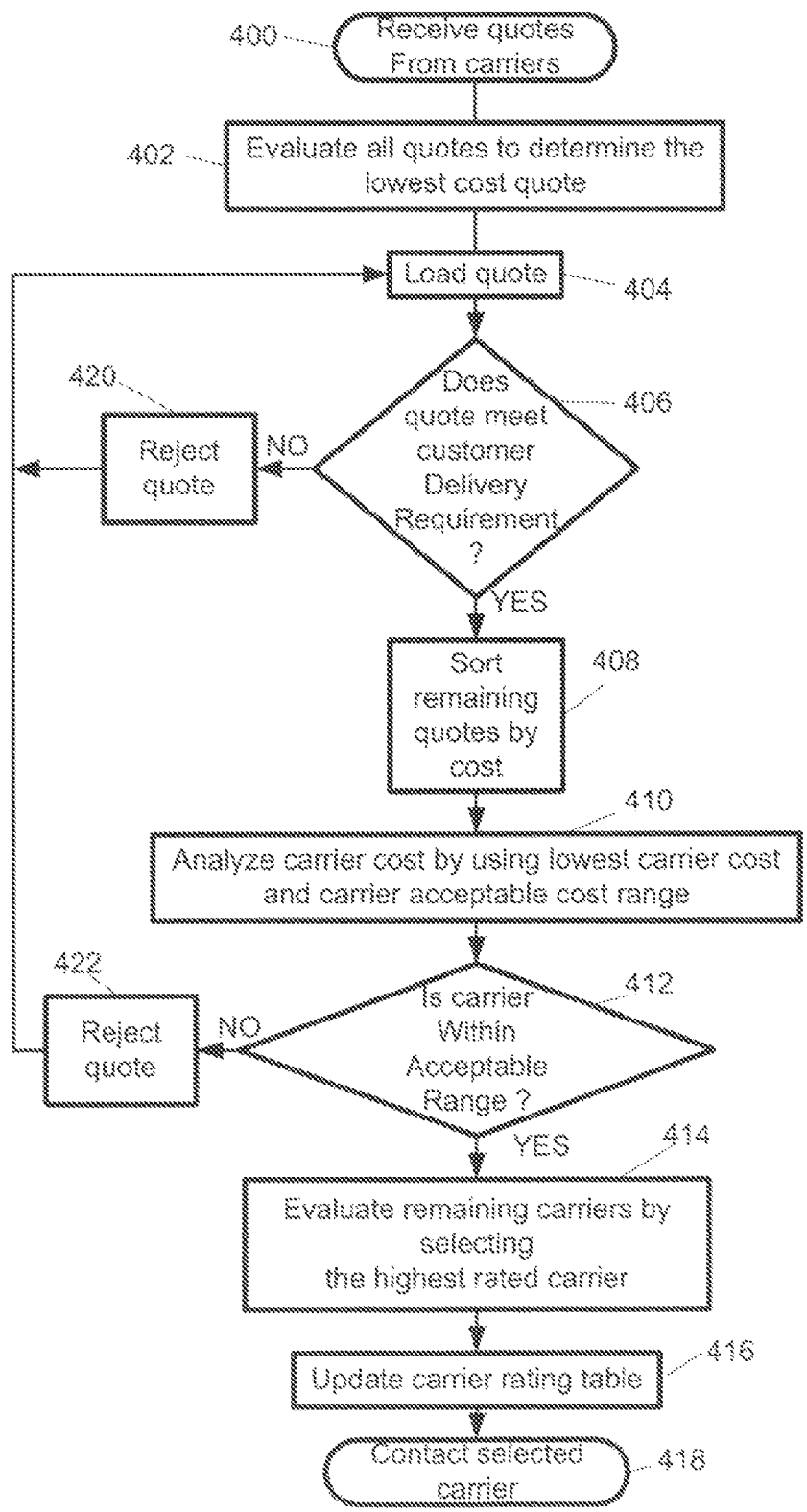
FIG. 9 is a software flowchart illustrating the process for evaluating received carrier quotations.

FIG. 9 illustrates step 210 in FIG. 2 which is the process of analyzing the received carrier quotes. In step 402, the quotes are first evaluated to determine the lowest cost quote. The specific quote is then loaded in step 404 and in step 406, it is determined if this quote meets all the customer delivery requirements such as time to delivery. If customer requirements are not met, the quote is rejected in step 420 and the next quote is loaded. However, if all requirements are met, then in step 408, the quotes are sorted by cost. In step 410 the carrier quotes are analyzed to determine the lowest quote and to determine if this lowest quote is within the acceptable cost range for the carrier. The cost range is illustrated in FIG. 7. In step 412, it is determined whether the carrier quote is within an acceptable cost range. If not, the quote is rejected in step 422. However, if the quote is within an acceptable cost range, in step 414 the remaining carriers are sorted by quality ratings (FIG. 7) and the carrier with the highest overall quality rating is selected. In step 416, the carrier rating table in the database is then updated with this additional information. In the last step, step 418, the selected carrier is contacted.

Figure 10:
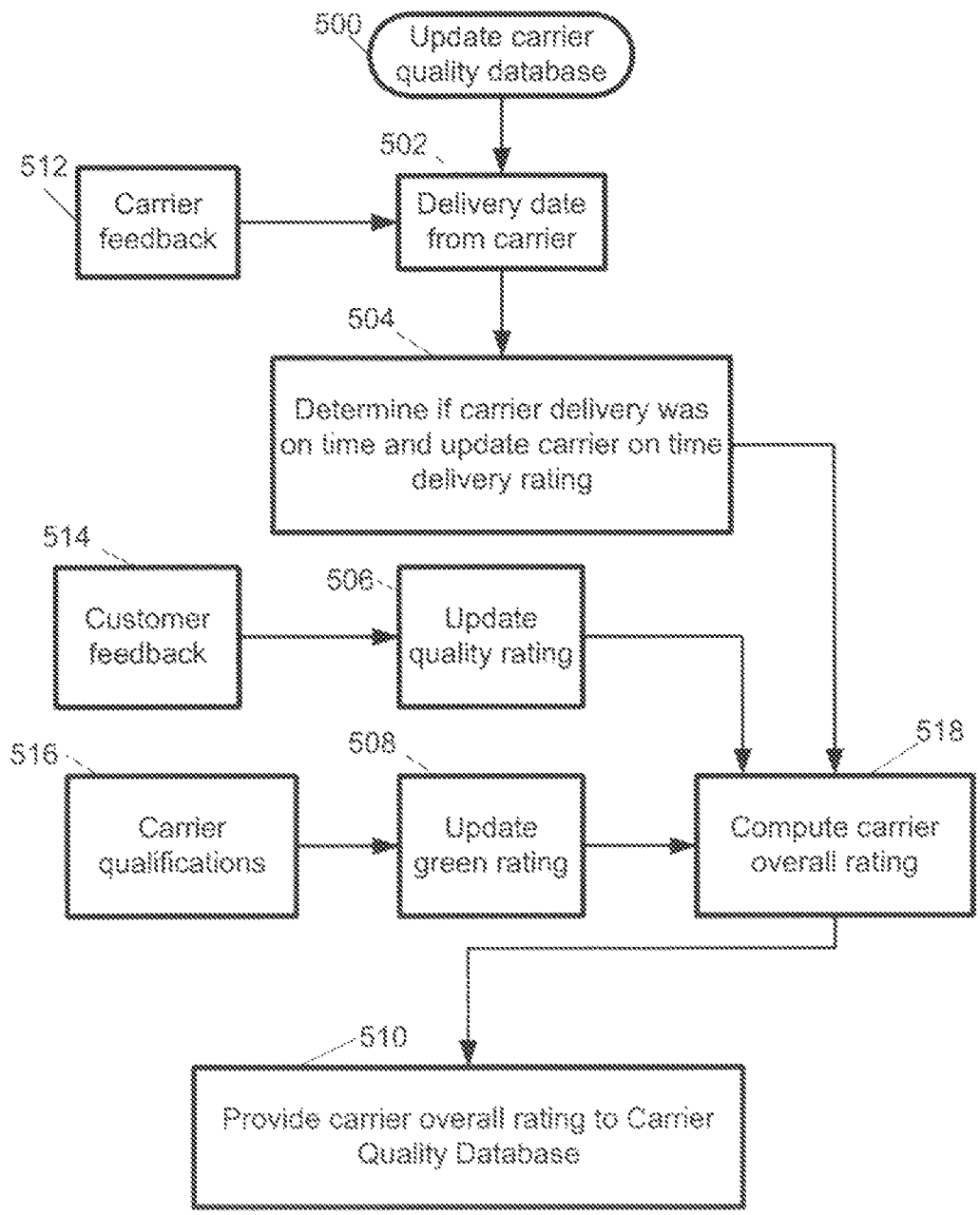
FIG. 10 is a software flowchart illustrating the process for updating the carrier quality database.

FIG. 10 is a diagram illustrating the process of updating the carrier quality database corresponding to step 216 of FIG. 2. Referring to FIG. 10, step 502 receives the actual delivery date from the selected carrier provided from carrier feedback in step 512. Step 504 determines whether this delivery was an on-time delivery and the carrier's on-time delivery rating is updated accordingly. This on-time delivery rating is illustrated in the carrier rating table of FIG. 7. Also, step 514 provides any customer feedback received to update the quality rating in step 506. This quality rating is illustrated in the carrier rating table of FIG. 7. In step 516, the carrier qualifications may be updated and are used to update the green rating number for the carrier in step 508. The green rating is shown in the carrier rating table of FIG. 7. Together the updating of the on-time delivery of step 504, the quality customer quality rating in step 506 and the green rating in step 508 are used in step 518 to compute a new overall carrier quality rating. Then, in step 510, these ratings are updated in the quality carrier quality database.

Step 212 of FIG. 2, the preparation of the product shipment for the carrier, is shown in greater detail in FIG. 11. In step 602, the customer shipment information and packaging specification is sent to the assembly line. In step 604, an optical scanner analyzes the actual dimensions of the shipping package. Then in step 606, the actual customer product shipping weight is received from the assembly line weight scale. In step 608, it is determined whether the actual dimensions and actual weight of the shipping package are in conformance with the original specifications of the carrier's quote. If not, the process proceeds to step 610 which revises the requests for quotation with the actual measured dimensions and weight determined from the assembly line. The program returns to the requests for quotation step 206 of FIG. 2. However, if the weight does conform to the specifications of the carriers quote, the program goes to step 612 to prepare the customer shipment. The program then sends the actual data to the carrier with a request to pick up the shipment for delivery. Step 614 ships the order to the customer.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be implemented substantially concurrently, or the blocks may sometimes be implemented in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While particular embodiments of the present invention have been shown and described, it will be obvious to those skilled in the art that, based upon the teachings herein, that changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

The invention claimed is:

1. A method of shipping products using a processor connected to a network comprising the steps of:
   sending by the processor requests for quotations by electronic transmission to a plurality of selected carriers;
   selecting by the processor a carrier quotation based upon quotations received by electronic transmission and a carrier quality database and updating the carrier quality database with the selected carrier and quotation;
   preparing the product shipment including using an optical scanner connected to the processor to measure product shipment dimensions and a weight scale connected to the processor to measure product shipment weight; and
   if the measured product shipment dimensions and weight do not conform to the selected quotation, repeating the sending step, the selecting step and the preparing step with measured shipment dimensions and weight or, if the measured product shipment dimensions and weight do conform to the selected quotation, notifying carrier to ship the product.

2. A method according to claim 1 wherein the sending step includes a step of selecting the carrier based upon a customer order specification.

3. A method according to claim 1 wherein the sending step includes a step of selecting the carrier based upon available delivery options.

4. A method according to claim 1 wherein the sending step includes a step of selecting the carrier based upon data in the carrier quality database.

5. A method according to claim 1 further including a step of updating the carrier quality database with actual delivery results received from the carrier.

6. A method according to claim 1 further including a step of updating the carrier quality database with feedback received from the customer.

7. A system for shipping products to customers comprising:
   a network providing electrical transmission of message communications with at least one customer and with a plurality of carriers;
   a shipping data processor connected to said network and further connecting to an optical scanner and a weight scale and having a memory containing a carrier quality database and a program of instructions for communicating with the customer and the plurality of carriers to assemble a customer product shipment and select one of the plurality of carriers to convey the product shipment to the customer and wherein the program of instructions perform the steps of:
   sending by the processor requests for quotations by electronic transmission to a plurality of selected carriers;
   selecting by the processor a carrier quotation based upon quotations received by electronic transmission and a carrier quality database and updating the carrier quality database with the selected carrier and quotation;
   preparing the product shipment including using an optical scanner connected to the processor to measure product shipment dimensions and a weight scale connected to the processor to measure product shipment weight; and
   if the measured product shipment dimensions and weight do not conform to the selected quotation, repeating the sending step, the selecting step and the preparing step with measured shipment dimensions and weight or, if the measured product shipment dimensions and weight do conform to the selected quotation, notifying carrier to ship the product.

8. A system for shipping products to customers according to claim 7 wherein said network is further connected to a customer data processor.

9. A system for shipping products to customers according to claim 7 wherein said network is further connected to a plurality of carrier data processors.

10. A computer program product comprising a non-transitory computer readable storage medium having a computer readable program stored thereon, wherein the computer readable program, when executed on a processor, causes the processor to perform the steps of:
    (a) sending requests for quotations on a network by electronic transmission to a plurality of selected carriers based upon customer order specifications, available delivery options and a carrier quality database;
    (b) selecting a carrier quotation based upon quotations received by electronic transmission from the network and the carrier quality database and updating the carrier quality database with the selected carrier and quotation;
    (c) preparing the product shipment including using an optical connected to the processor to measure product shipment dimensions and a weight scale connected to the processor to measure product shipment weight; and
    (d) if the measured dimensions and weight do not conform to the selected quotation, repeating steps (a), (b) and (c) with measured product shipment dimensions and weight or, if the measured dimensions and weight do conform to the selected quotation, notifying carrier to ship the product.

11. The computer program product of claim 10 further including a step of updating the carrier quality database with actual delivery results received from the carrier.

12. The computer program product of claim 10 further including a step of updating the carrier quality database with actual delivery results received from the customer.

13. The computer program product of claim 10 wherein the sending step includes a step of selecting the carrier based upon a customer order specification.

14. The computer program product of claim 10 wherein the sending step includes a step of selecting the carrier based upon available delivery options.

15. The computer program product of claim 10 wherein the sending step includes a step of selecting the carrier based upon data in the carrier quality database.

* * * * *